(12) United States Patent
Saito et al.

(10) Patent No.: US 6,930,057 B2
(45) Date of Patent: Aug. 16, 2005

(54) COLUMNAR STRUCTURED MATERIAL AND MANUFACTURING METHOD THEREFOR

(75) Inventors: Tatsuya Saito, Kanagawa (JP); Tohru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/744,390

(22) Filed: Dec. 23, 2003

(65) Prior Publication Data

US 2004/0137150 A1 Jul. 15, 2004

(30) Foreign Application Priority Data

Dec. 27, 2002 (JP) ........................................ 2002-382252

(51) Int. Cl.⁷ ..................... H01L 21/31; H01L 21/461; B05D 3/00
(52) U.S. Cl. .................... 438/778; 427/271; 438/745; 438/770
(58) Field of Search ............................. 438/700, 745, 438/758, 770, 778; 427/271

(56) References Cited

U.S. PATENT DOCUMENTS

| 6,709,513 B2 * | 3/2004 | Fukunaga et al. ............ 117/90 |
| 6,750,153 B2 * | 6/2004 | Beetz et al. .................. 438/745 |

FOREIGN PATENT DOCUMENTS

| JP | H06-028093 | 2/1994 |
| JP | H10-121292 | 5/1998 |
| JP | H11-224422 | 8/1999 |
| JP | 2000-277330 | 10/2000 |

OTHER PUBLICATIONS

English Abstract corresponding to JP 2000–277330.
English Abstract corresponding to JP H10–121292.
English Abstract corresponding to JP H11–224422.
English Abstract corresponding to JP H06–028093.

* cited by examiner

*Primary Examiner*—Michael Tran
*Assistant Examiner*—Renee R. Berry
(74) *Attorney, Agent, or Firm*—Morgan & Finnegan LLP

(57) ABSTRACT

To provide a method for manufacturing a magnetic recording medium which creates anodically oxidized aluminum nanoholes so as to have a rectangular or elliptical sectional shape and gives shape anisotropy to a magnetic material filled in the nanoholes to thereby always fix a relative positional relation between magnetizations of the magnetic material and a magnetic head that detects the magnetizations. The method for manufacturing a magnetic recording medium includes: preparing a member having regularly arranged plural pits; subjecting the member to anodic oxidation treatment so that formation of holes is started with the pits as starting points, and a porous region, which has a first portion where the holes are formed without branching and a second portion where branched holes are formed, is formed; filling a magnetic material in the formed holes; and removing the non-branching portions of the holes.

6 Claims, 8 Drawing Sheets

DIRECTION OF APPLIED
MAGNETIC FIELD

COLUMNAR STRUCTURED MATERIAL AND MANUFACTURING METHOD THEREFOR

BACKGROUND OF THE INVENTION

1. Field of the Invention

The present invention relates to a manufacturing method for a structured material; and a magnetic recording medium, a magnetic recording and reproducing apparatus, an information processing apparatus, and a manufacturing method therefor. More specifically, the present invention relates to a manufacturing method for a magnetic recording medium using anodically oxidized aluminum. In particular, the present invention relates to a manufacturing method for a patterned medium or a discrete medium in which a magnetic material portion of a recording layer is partitioned into plural portions by partition walls of non-magnetic material.

2. Related Background Art

A recording density of a hard disk used as an external storage device for a computer has been continuously increasing at an annual rate of 100% with the support of progress in an advanced microfabrication technique or signal processing technique, and the like. Recently, a product, which makes recording at an extremely high-density of approximately 40 $Gbit/in^2$ possible, has also been released.

On the other hand, the hard disk has started to be used in full-scale in digital home electrical appliances such as a hard disk recorder and a car navigation system, making use of advantages of the hard disk, such as large capacity, nonvolatility, high reliability, and high-speed access. Thus, a high-density magnetic recording medium, which is smaller in size and larger in capacity, is required.

Currently, a recording system used in the hard disk is a longitudinal recording system for recording magnetizations continuously in a direction parallel with a substrate, which is a so-called in-plane recording system. In the in-plane recording system, reproduction is performed by a magnetic head using a leaked magnetic field from a magnetized transition region provided between magnetized recording sections adjacent to each other. The magnetized recording section is constituted by plural magnetic particles, and these plural magnetic particles are used to record one bit in the magnetized recording section.

However, it is considered that, if a recording density will further increase in future as described above, the recording density will soon reach a physical limit with the current system. This is because, since a recording region for one bit becomes smaller as the recording density becomes higher, it is necessary to reduce a size of the magnetic particles forming the recording region to clarify borders among bits in order to secure sufficient S/N. Moreover, since the leaked magnetic field decreases due to an influence of a demagnetizing field, it is also necessary to reduce a thickness of a magnetic layer. Therefore, it is anticipated that a volume of the magnetic particles is extremely reduced and a region with the recording density exceeding 200 $Gbit/in^2$ falls into a superparamagnetic state in which magnetization directions cannot be maintained due to an influence of thermal energy.

As means for avoiding such a situation and making higher-density magnetic recording possible, a vertical magnetic recording system, which uses a magnetic material having magnetic anisotropy in a vertical direction with respect to a substrate as a recording layer and records magnetizations in the vertical direction, is considered effective.

The vertical magnetic recording system has such a characteristic that, in contrast to the in-plane recording system, the demagnetizing field decreases as the recording density increases. Thus, since a magnetic layer can be kept thick, the vertical magnetic recording system is more advantageous with respect to superparamagnetism than the in-plane recording system. In the vertical magnetic recording system, Co—Cr alloy is generally used as the recording layer. When the Co—Cr alloy is formed on the substrate by the sputtering, Co and Cr grow with compositions thereof separated. A portion with a large quantity of Co component is columnar and becomes a ferromagnetic portion having a hexagonal closed-packed structure (hcp structure) to function as a recording section. A portion with a large quantity of Cr component, which grows so as to surround the columnar recording section, is a non-magnetic portion and also functions to weaken a magnetic interaction between recording sections adjacent to each other.

However, even in the vertical magnetic recording system, since a segregation structure of Co—Cr is used, a size and a shape of the recording portion lack uniformity, and it is extremely difficult to arrange the recording sections regularly. Therefore, borders among bits have an irregular shape in an ultra-high density region, and decrease in S/N is also apprehended.

Thus, for example, a next-generation magnetic recording medium called a patterned medium is attracting attention (Japanese Patent Application Laid-open No. 2000-277330 (page 5, FIG. 3)). The patterned medium is a magnetic recording medium, in which magnetic domains independent from each other are formed by regularly arranging magnetic materials with the same size and shape on a substrate, and one bit is recorded on each magnetic domain. In this case, each magnetic domain that records one bit has an independent shape, and therefore, even if magnetic particles are large, a border with a neighboring bit has a clear and uniform shape. Thus, decrease in S/N is not caused. In other words, the magnetic recording medium is more advantageous with respect to superparamagnetism than a continuous medium of an identical recording density. It can be said that the magnetic recording medium has a structure suitable for ultra-high density recording.

Next, since the present invention uses an anodically oxidized aluminum nanohole formed by anodic oxidation of Al, the anodically oxidized aluminum nanohole will be hereinafter described.

When an Al substrate is subjected to the anodic oxidation in an acid electrolyte of sulfuric acid, oxalic acid, phosphoric acid, or the like, an anodic oxide film, which is a porous anodic oxide film, is formed. This porous film is characterized by having a unique geometrical structure in which extremely fine columnar microholes (nanoholes) with a diameter of several nm to several hundred nm are arranged in parallel with each other at an interval of several tens nm to several hundred nm. The columnar microholes have a high aspect ratio and is excellent in uniformity of a depth and a diameter of a section thereof.

In addition, it is possible to control the structure of the porous film to some degree by changing conditions of the anodic oxidation. For example, it is known that it is possible to control an interval, a depth, and a diameter of the microholes to some degree with an anodic oxidation voltage, an anodic oxidation time, and pore widening treatment, respectively. Here, the pore widening treatment is etching treatment of alumina. Usually, wet etching treatment with phosphoric acid is used as the pore widening treatment.

Moreover, there is also proposed a method of forming starting points for formation of microholes using a stamper in order to improve controllability of a shape, an interval, and a pattern of microholes of a porous film. This is a method of forming pits, which are created by pressing a substrate provided with plural projections on a surface thereof against a surface of an Al substrate, as starting points for formation of microholes and then subjecting the pits to anodic oxidation to create a porous film having microholes showing better controllability of a shape, an interval, and a pattern (Japanese Patent Application Laid-open No. H10-121292 (page 9, FIG. 8)).

It has already been publicly known to apply nanoholes to a magnetic recording medium such as a patterned medium by filling a magnetic material in the above-mentioned anodically oxidized aluminum nanoholes (Japanese Patent Application Laid-open No. H11-224422 (page 7, FIG. 1)).

However, since the nanoholes are usually columnar as described above, inconvenience occurs in the case in which magnetizations of the filled magnetic material face to an in-plane direction of a substrate. In other words, since sections of the nanoholes are circular, it is likely that the filled magnetic material cannot obtain a stable direction in terms of energy according to shape anisotropy in the in-plane direction, and the magnetizations rotate in the plane, or the magnetizations are not arranged in a track direction. This means that a relative positional relation between a direction of magnetizations of the magnetic material filled in the nanoholes and a magnetic head that detects the direction of magnetizations changes for each nanohole, and the magnetic recording medium cannot perform recording and reproduction accurately.

In addition, there is also proposed to, by forming a magnetic domain in a rectangular or elliptical shape, give shape anisotropy to magnetic particles to improve a coercive force and to arrange magnetizations in a track direction (Japanese Patent Application Laid-open No. H6-028093 (page 3, FIG. 1)).

However, in this method, a drawing process by micro beams such as electron beam lithography is required for regularly arranging magnetic domains. Although accuracy of finishing of the electron beam lithography is extremely high, a throughput thereof is poor because it is not collective lithography like photolithography. Thus, it is extremely difficult to apply treatment to a large area. In other words, it can be said that a method of patterning magnetic domains one by one with the electron beam lithography is unrealistic in terms of productivity in the current technique.

SUMMARY OF THE INVENTION

It is an object of the present invention to solve the above-mentioned problems and provide a manufacturing method for a structured material which creates anodically oxidized aluminum nanoholes so as to have a rectangular or elliptical sectional shape and gives shape anisotropy to a magnetic material filled in the nanoholes to thereby always fix a relative positional relation between magnetizations of the magnetic material and a magnetic head that detects the magnetizations.

In addition, it is another object of the present invention to provide a manufacturing method for a structured material which causes nanoholes, which are formed from starting points for nanohole formation provided on a substrate, to branch in a self-organized manner in a formation process thereof to thereby eventually form the nanoholes with a density twice or more as high as a dot density at the starting points for formation provided on the substrate and make it possible to improve a dot density, that is, a recording density more easily.

The above-mentioned problems are solved by the following means according to the present invention.

According to the present invention, there is provided a manufacturing method for a structured material, including:

preparing a member having plural pits which are arranged regularly;

subjecting the member to anodic oxidation treatment so that formation of holes is started with the pits as starting points, and a porous region having a first portion where the holes are formed without branching and a second portion where branched holes are formed is formed; and removing the first portion.

Described below is a preferable embodiment of the manufacturing method for a structured material according to the present invention.

In the step of forming holes with anodic oxidation, it is preferable to cause the holes to branch into two in a self-organized manner in a process of forming at least a part of the holes.

It is preferable to form pits which are arranged in a rectangular shape or a rhomboidal shape on the substrate.

It is preferable that intervals of the pits, which are arranged in a rectangular shape or a rhomboidal shape on the substrate, include a long interval and a short interval, and the long interval is 1.5 to 2.0 times as long as the short interval.

In the rectangular or rhomboidal arrangement of the pits formed on the substrate, it is preferable that anodic oxidation is performed by applying an anodic oxidation voltage corresponding to the short interval of the arrangement to the pits.

Next, a related invention, to which the manufacturing method for a structured material of the present invention is applied, will be described.

It is an object of this related invention to solve the above-mentioned problems and provide a manufacturing method for a magnetic recording medium which creates anodically oxidized aluminum nanoholes so as to have a rectangular or elliptical sectional shape and gives shape anisotropy to a magnetic material filled in the nanoholes to thereby always fix a relative positional relation between magnetizations of the magnetic material and a magnetic head that detects the magnetizations.

In addition, it is another object of the related invention to provide a manufacturing method for a high density magnetic recording medium which causes nanoholes, which are formed from starting points for nanohole formation provided on a substrate, to branch in a self-organized manner in a formation process thereof to thereby eventually form the nanoholes with a density twice or more as high as a dot density at the starting points for formation provided on the substrate and make it possible to improve a dot density, that is, a recording density more easily.

Further, a recording system of the magnetic recording medium according to the related invention is not limited to an in-plane magnetic recording system, and it is also possible to use a vertical magnetic recording system.

A constitution of the related invention of the present invention will be hereinafter described.

A first aspect of the related invention relates to a manufacturing method for a magnetic recording medium including: preparing a member having regularly arranged plural pits; subjecting the member to anodic oxidation treatment so that formation of holes is started with the pits as starting points, and a porous region having a first portion where the holes are formed without branching and a second portion where branched holes are formed is formed; filling a magnetic material in the formed holes; and removing the non-branching portions of the holes.

In the step of forming holes with anodic oxidation, it is preferable to cause the holes to branch into two in a self-organized manner in a process of forming at least a part of the holes.

It is preferable to form pits which are arranged in a rectangular shape or a rhomboidal shape on the substrate.

It is preferable that intervals of the pits, which are arranged in a rectangular shape or a rhomboidal shape on the substrate, include a long interval and a short interval, and the long interval is 1.5 to 2.0 times as long as the short interval.

In the rectangular or rhomboidal arrangement of the pits formed on the substrate, it is preferable that anodic oxidation is performed by applying an anodic oxidation voltage corresponding to the short interval of the arrangement to the pits.

It is preferable to, after forming the branched holes, fill a magnetic material in the holes with plating.

It is preferable to remove the non-branching portions in the holes by polishing the surface of the substrate after filling the magnetic material in the holes.

It is preferable to remove the non-branching portions in the holes by wet etching the substrate after filling the magnetic material in the holes.

It is preferable to remove the non-branching portions in the holes by polishing the surface of the substrate after forming the branched holes.

It is preferable to fill the magnetic material in the microholes of the remaining branched portions after removing the non-branching portions in the holes.

A second aspect of the related invention relates to a magnetic recording medium manufactured by the above-described manufacturing method for a magnetic recording medium.

A third aspect of the related invention relates to a recording/reproducing apparatus using the above-mentioned magnetic recording medium.

A fourth aspect of the related invention relates to an information processing apparatus using the above-mentioned magnetic recording medium.

DESCRIPTION OF THE PREFERRED EMBODIMENTS

The present invention will be hereinafter described in detail.

<A Manufacturing Method for a Magnetic Recording Medium>

A manufacturing method for a magnetic recording medium according to the present invention uses anodically oxidized aluminum nanoholes obtained by subjecting a substrate, which contains Al as a main component, to anodic oxidation.

For aluminum nanoholes which are formed in a self-organized manner, a diameter of the nanoholes can be controlled in a range from several nm to several hundred nm, and an interval of the nanoholes can also be controlled in a range from a value slightly larger than the diameter of a nanohole to approximately 500 nm. It is possible to use various acids for the anodic oxidation of Al. However, sulfuric acid bath is preferable for forming nanoholes with a fine interval, phosphoric acid bath is preferable for forming nanoholes with a relatively large interval, and oxalic acid bath is preferable for forming nanoholes with an interval of an intermediate size. In addition, it is also possible to expand the diameter of the nanoholes by etching the substrate in a solution of phosphoric acid after the anodic oxidation.

Figure 1A:
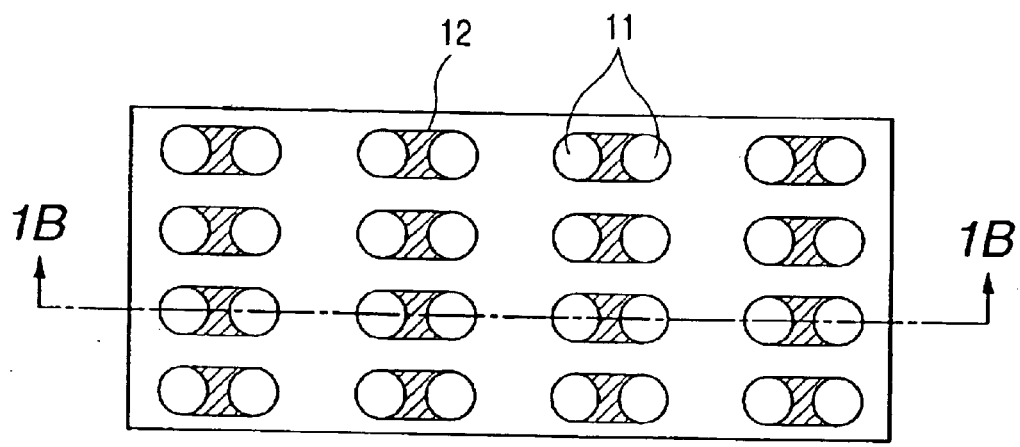
FIGS. 1A and 1B are schematic diagrams showing nanoholes which have branched into two in a formation process of holes in the present invention.
Figure 1B:
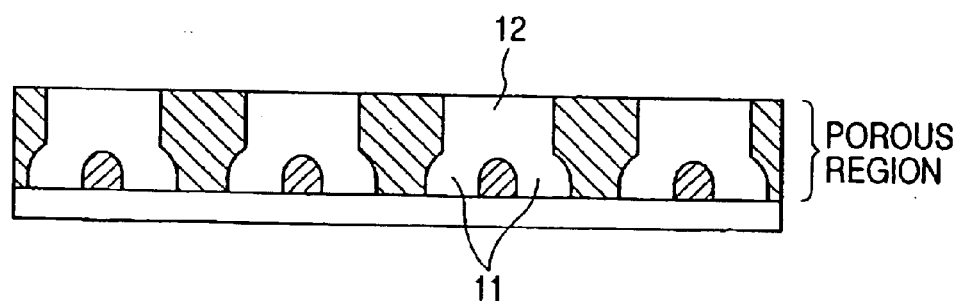
Figure 2A:
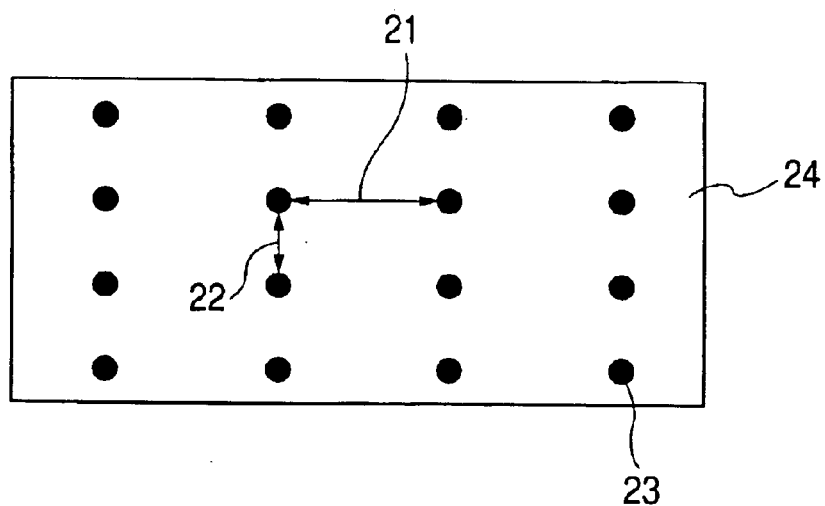
FIG. 2A is a schematic diagram showing a rectangular arrangement of pits of starting points for nanohole formation in the present invention.
Figure 2B:
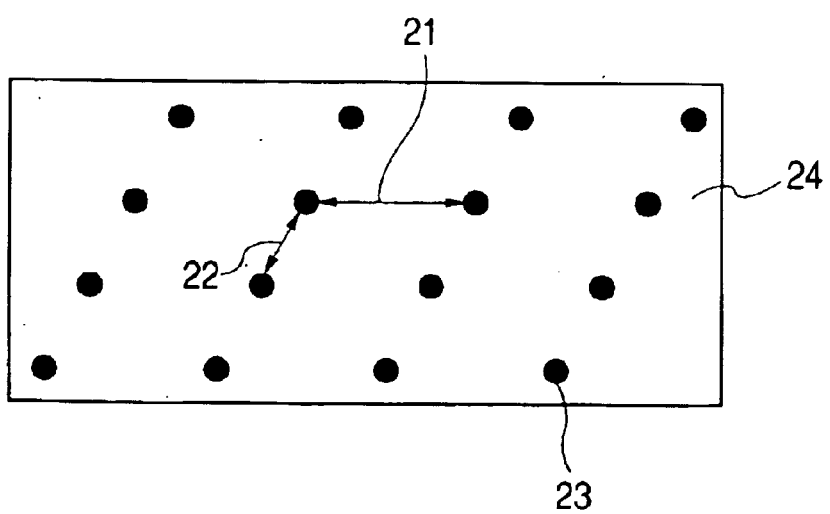
FIG. 2B is a schematic diagram showing a rhomboidal arrangement of pits starting points for nanohole formation in the present invention.

FIGS. 1A and 1B are schematic diagrams showing nanoholes which have branched into two in a formation process of holes. FIG. 1A shows a plan view and FIG. 1B shows a sectional view taken along a line 1B—1B in FIG. 1A. FIGS. 2A and 2B are schematic diagrams showing a rectangular arrangement and a rhomboidal arrangement of pits of starting points for nanohole formation, respectively.

In order to form nanoholes 11 which have branched into two as shown in FIGS. 1A and 1B in this embodiment, first, as shown in FIGS. 2A and 2B, it is necessary to form pits 23, which become starting points for formation of the nanoholes, in a rectangular arrangement (FIG. 2A) or an rhomboidal arrangement (FIG. 2B) on a substrate 24 to be anodically oxidized containing Al as a main component. Examples of a method of forming the pits 23 include patterning by an electron beam lithography, patterning by a focused ion beam (FIB), and a method of pressing a stamper having patterned projections against a surface of a substrate.

However, the method of forming the pits 23 is not specifically limited to these methods, and any method can be used as long as starting points for nanohole formation can be formed on a substrate.

Subsequently, in subjecting the substrate, on which the starting points are formed, to anodic oxidation, it is desirable to perform the anodic oxidation by applying an anodic oxidation voltage corresponding to a short interval 22 of arrangement in the rectangular or rhomboidal arrangement of the pits formed on the substrate shown in FIGS. 2A and 2B. It is desirable that a relation between an anodic oxidation voltage V (Volt) and an interval 2R (nm) of nanoholes to be formed is 2R=2.5×V and, for example, in the case in which pits are arranged at a period of 100 nm×150 nm in a rectangular shape, the anodic oxidation voltage is set to 40 V. In addition, in this case, if an anodic oxidation voltage corresponding to a long interval 21 of the arrangement is applied, the nanoholes to be formed tend to be less likely to branch compared with the case in which an anodic oxidation voltage corresponding to the short interval 22 is applied. A sectional shape of the nanoholes formed in this way is an elliptical or rectangular shape extending in the direction of the long interval 21.

Here, the short interval 22 of the arrangement is defined as an interval between a certain pit and a pit in the closest vicinity of the pit, and the long interval 21 of the arrangement is defined as an interval between the certain pit and a pit in the second closest vicinity of the pit. In addition, the rectangular arrangement is defined as an arrangement of pits in the case in which the direction of the short interval 22 and the direction of the long interval 21 form an angle of 90 degrees, and an arrangement of pits in the case in which the directions form an angle other than 90 degrees is defined as a rhomboidal arrangement.

One nanohole 12 branching into two nanoholes 11 in FIGS. 1A and 1B is formed in a position of one pit 23 in FIGS. 2A and 2B. With the pits 23 in FIGS. 2A and 2B as starting points, formation of microholes progresses. The microholes do not branch at an initial stage and then branch into two in the middle of the formation, whereby nanoholes are formed. Therefore, it is preferable to form the pits 23 with a certain degree of interval.

Figure 3:
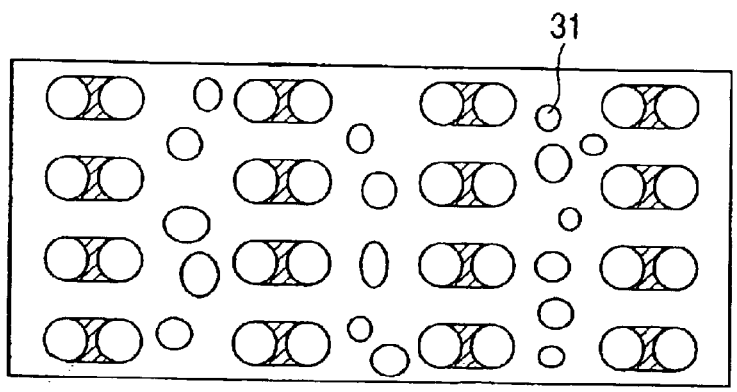
FIG. 3 is a schematic diagram showing nanoholes formed in unintended portions.

Whether or not the nanoholes branch into two in a self-organized manner depends upon an interval of the pits formed on the substrate in addition to the above-mentioned anodic oxidation voltage. In the rectangular or rhomboidal arrangement of the pits, it is not desirable that the short interval and the long interval are different significantly, because, although the nanoholes branch into two, nanoholes 31 are also formed in unintended portions such as a region between the long intervals as shown in FIG. 3 to cause irregularity in the arrangement of nanoholes.

On the other hand, it is not desirable that the short interval and the long interval are substantially the same, because the nanoholes do not branch into two and a sectional shape thereof is nearly circular or square. The present inventors confirmed, as a result of concentrating their energy in examination, that, when the long interval was in a range of 1.5 to 2.0 times, preferably 1.7 to 1.8 times as long as the short interval, nanoholes were not formed in unintended portions, and nanoholes to be formed branched into two and a sectional shape thereof was elliptical or rectangular extending in a direction of the long interval. In addition, the inventors confirmed that, in the case in which an anodic oxidation voltage corresponding to the long interval was applied, the nanoholes as described above were obtained when the long interval was 1.8 to 2.0 times as long as the short interval.

Figure 4A:
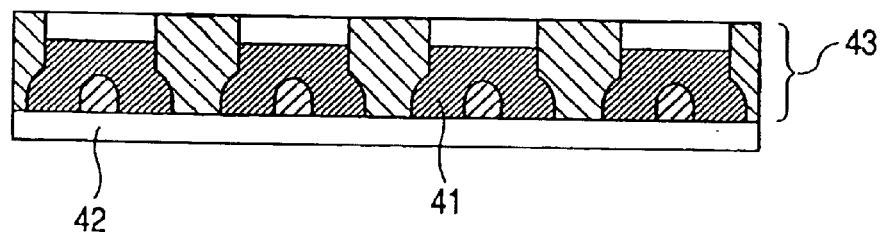
FIGS. 4A and 4B are schematic diagrams showing a formation process of nanoholes, which have branched into two, in the present invention.

Subsequently, as shown in FIG. 4A, a magnetic material 41 is filled in the nanoholes formed as described above. As a method of filling the magnetic material 41, plating is preferable from the viewpoint that it can also be filled in nanoholes with a high aspect ratio. Here, when a height of a nanohole is assumed to be "x" and a longest diameter in the sectional shape thereof is assumed to be "y", the aspect ratio is defined as x/y. As a base electrode layer 42 to be electrodes for the plating, it is advisable to provide noble metals, or Cu or alloy containing Cu as a main component, which has high controllability of plating, under an anodic oxide layer.

Figure 4B:
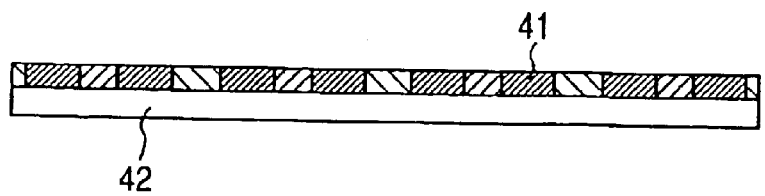

Moreover, a portion 43 of the nanoholes not having branched into two are removed by surface polishing, whereby nanoholes after having branched into two are exposed to the surface of the substrate as shown in FIG. 4B. Consequently, a density of the nanoholes on the surface of the substrate is twice as high as a density of the removed portion, that is, a density of the starting points for nanohole formation formed on the substrate. In this way, in consequence, a pattern finer than the patterning applied first can be formed by making use of self-organization.

Further, in the steps shown in FIGS. 4A and 4B, a magnetic material may be filled after the portions of the nanoholes not having branched into two are removed by the surface polishing. In this case, since an aspect ratio of the nanoholes, in which the magnetic material is filled, decreases, it is possible to fill the magnetic material with various methods such as sputtering, vacuum evaporation, and CVD in addition to the plating.

Moreover, a protective film made of a non-magnetic material such as DLC or nitrides may be formed on the surface of the substrate in a state in which the portions of the nanoholes not having branched into two are removed and the magnetic material is filled in the remaining portion of the nanoholes having branched into two. With the protective film, effects such as prevention of oxidation of a magnetic layer and improvement of an abrasion resistance property with respect to a magnetic head can be expected.

In order to create the film to be anodically oxidized containing Al as a main component in the present invention, described above, it is possible to use various film forming methods such as vacuum evaporation by resistance heating, sputtering, and CVD. However, a method with which a film having an acceptably flat surface cannot be formed is not preferable.

In addition, it is possible to use plastics, Si, glass, carbon, Al plated with Ni—P, SiC, or the like as the substrate.

A magnetic recording medium can be obtained from the structured material, which is manufactured by the method of the present invention, by filling a magnetic material in the nanoholes of the structured material.

In addition, the present invention makes it possible to apply the nanoholes of the structured material in various forms and remarkably extend a range of application thereof. For example, the nanoholes of the structured material in the present invention can be applied as a functional element by filling a functional material therein. Further, the nanoholes of the structured material can be applied as a single electron memory, a single electron transistor, or the like utilizing a quantum effect by filling a conductive material therein. The structured material itself can be used as a functional material such as a photo emission device, an optical device, or a micro device. In addition, the structured material can also be used as a base material, a mold, or the like for a further new structured material.

EXAMPLES

The present invention will be hereinafter described more specifically with reference to the following examples.

First Example

This example relates to formation of nanoholes branching into two. In particular, a case in which an anodic oxidation voltage corresponding to a short interval of pits formed on a substrate was applied to perform anodic oxidation was examined.

Figure 5A:
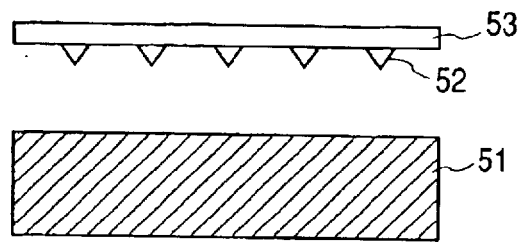
FIGS. 5A, 5B, and 5C are schematic diagrams showing formation of starting points with a stamper.
Figure 5B:
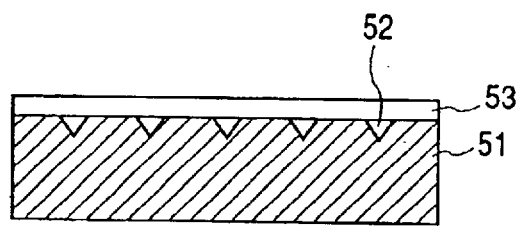
Figure 5C:
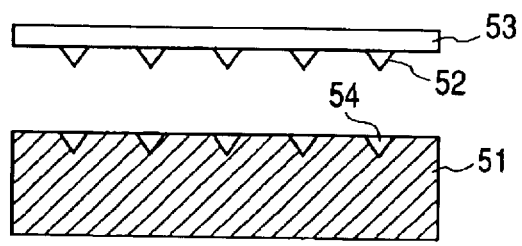

Al was deposited with a thickness of 200 nm on an Si (100) substrate by sputtering, and pits 54, which became starting points for formation of nanoholes, arranged in a rectangular shape, were formed on a surface of Al 51 by a stamper 53 having projections 52 as shown in FIGS. 5A to 5C. In this example, the stamper 53 having the projections 52 was manufactured by patterning SiC with an electron beam lithography, and the stamper 53 was pressed against the surface of the Al 51 by a hydraulic press in a state in which the surface of the Al 51 and the projections 52 were in close adherence, whereby the projections 52 were transferred to the surface of the Al 51. In this case, an interval of the projections 52 of the stamper 53 arranged in the rectangular shape were changed to manufacture samples A to H shown in Table 1-1 and Table 1-2 below.

An anodic oxidation voltage of 40 V was applied to the samples A to H at a temperature of 16° C. in 0.3 mol/L of an oxalic acid solution to subject the samples to anodic oxidation. Here, the applied voltage of 40 V is an anodic oxidation voltage corresponding to 100 nm, that is, the short interval of pits, from the relational expression of $2R=2.5 \times V$. After the anodic oxidation, wet etching (pore widening) treatment to immerse the samples in 5 wt % of a phosphoric acid solution for 40 minutes was performed. Thereafter, surfaces and sectional shapes of the samples were observed by an FE-SEM (field emission scanning electron microscope). The results of the observation are shown in Table 1-1 and Table 1-2.

TABLE 1-1

| | Sample | | | |
|---|---|---|---|---|
| | A | B | C | D |
| Arrangement of Pits | Rectangular | Rectangular | Rectangular | Rectangular |
| Internal of Pits | 100 × 130 | 100 × 140 | 100 × 150 | 100 × 170 |
| Acid Used | Oxalic Acid | Oxalic Acid | Oxalic Acid | Oxalic Acid |
| Voltage of Anodic Oxidation | 40 V | 40 V | 40 V | 40 V |
| Pore Widening | 40 Minutes | 40 Minutes | 40 Minutes | 40 Minutes |
| Shape of Nanoholes | Columnar | Columnar | Two-Way Branched | Two-Way Branched |
| Regularity | Yes | Yes | Yes | Yes |

TABLE 1-2

| | Sample | | | |
|---|---|---|---|---|
| | E | F | G | H |
| Arrangement of Pits | Rectangular | Rectangular | Rectangular | Rectangular |
| Internal of Pits | 100 × 180 | 100 × 200 | 100 × 210 | 100 × 220 |
| Acid Used | Oxalic Acid | Oxalic Acid | Oxalic Acid | Oxalic Acid |
| Voltage of Anodic Oxidation | 40 V | 40 V | 40 V | 40 V |
| Pore Widening | 40 Minutes | 40 Minutes | 40 Minutes | 40 Minutes |
| Shape of Nanoholes | Two-Way Branched | Two-Way Branched | Two-Way Branched | Two-Way Branched |
| Regularity | Yes | Yes | No | No |

As shown in Table 1-1 and Table 1-2, in the samples A and B, although a sectional shape of formed nanoholes was a shape close to an elliptical one extending in the direction of the long interval, the nanoholes did not branch into two, and columnar nanoholes were obtained. In the samples C to F, as shown in FIGS. 1A and 1B, nanoholes having branched into two in the direction of the long interval were obtained in a formation process of nanoholes. In addition, a sectional shape of the nanoholes was a shape extending in the direction of the long interval. The shape was close to an ellipse in the sample C and close to a rectangle in the sample F. In the samples D and E, the sectional shape was substantially intermediate between elliptical and rectangular ones. In the samples G and H, although the nanoholes branched into two, it was confirmed that unintended nanoholes were formed so as to interpolate portions where pits were not created, and regularity of the arrangement of the nanoholes was disturbed significantly as shown in FIG. 3.

From the above results, it was confirmed that, in the case in which an anodic oxidation voltage corresponding to the short interval was applied to the arrangement of pits of the rectangular shape formed on the substrate, the nanoholes having branched into two were formed regularly when the long interval of pits was 1.5 to 2.0 times as long as the short interval.

On the other hand, it was confirmed that, in the case in which the long interval of pits was less than 1.4 times as long as the short interval, the nanoholes did not branch into two, and in the case in which the long interval is larger than 2.1 times as long as the short interval, although the nanoholes branched into two, since nanoholes were also formed at places other than the starting points for formation of the nanoholes provided on the substrate, irregularity in arrangement of the nanoholes was caused.

Second Example

This example relates to a case in which an anodic oxidation voltage corresponding to the long interval of pits formed on the substrate was applied to perform anodic oxidation in the first example.

As in the first example, samples with pits formed on a substrate were manufactured, anodic oxidation and pore widening were applied to the samples, and surfaces and sectional shapes of the samples were observed by the FE-SEM. An anodic oxidation voltage was set to a voltage corresponding to the long interval of the arrangement of pits using the relational expression $2R=2.5 \times V$. In this case, 0.3 mol/L of a phosphoric acid solution was used instead of 0.3 mol/L of the oxalic acid solution for the samples to which a high anodic oxidation voltage was applied. In addition, a time for the pore widening is set to a time of the same value as the anodic oxidation voltage. The results of the observation are shown in Table 2-1 and Table 2-2.

TABLE 2-1

| | Sample Columnar | | | |
|---|---|---|---|---|
| | I | J | K | L |
| Arrangement of Pits | Rectangular | Rectangular | Rectangular | Rectangular |
| Internal of Pits | 100 × 130 | 100 × 140 | 100 × 150 | 100 × 170 |
| Acid Used | Oxalic Acid | Oxalic Acid | Oxalic Acid | Oxalic Acid |
| Voltage of Anodic Oxidation | 52 V | 56 V | 60 V | 68 V |
| Pore Widening | 52 Minutes | 56 Minutes | 60 Minutes | 68 Minutes |
| Shape of Nanoholes | Columnar | Columnar | Columnar | Columnar |
| Regularity | Yes | Yes | Yes | Yes |

TABLE 2-2

| | Sample | | | |
|---|---|---|---|---|
| | M | N | O | P |
| Arrangement of Pits | Rectangular | Rectangular | Rectangular | Rectangular |
| Internal of Pits | 100 × 180 | 100 × 200 | 100 × 210 | 100 × 220 |
| Acid Used | Phosphoric Acid | Phosphoric Acid | Phosphoric Acid | Phosphoric Acid |
| Voltage of Anodic Oxidation | 72 V | 80 V | 84 V | 88 V |
| Pore Widening | 72 Minutes | 80 Minutes | 84 Minutes | 88 Minutes |
| Shape of Nanoholes | Two-Way Branched | Two-Way Branched | Two-Way Branched | Two-Way Branched |
| Regularity | Yes | Yes | No | No |

Figure 6:
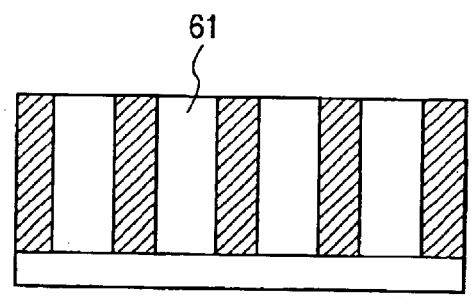
FIG. 6 is a schematic diagram showing nanoholes formed in a columnar shape.

As shown in Table 2-1 and Table 2-2, in this example, the same nanoholes as those in the samples A and B obtained in the first example were formed in samples I to L. In other words, although a sectional shape of the nanoholes was a shape close to an ellipse extending in the direction of the long interval, the nanoholes did not branch into two, and columnar nanoholes 61 as shown in FIG. 6 were obtained. In the samples M and N, as in the samples C to F obtained in the first example, nanoholes having branched into two in the direction of the long interval were obtained in the formation process of nanoholes. In the samples O and P, as in the samples G and H in the first example, although the nanoholes branched into two, it was confirmed that unintended nanoholes were formed, and regularity of the arrangement of the nanoholes was disturbed significantly as shown in FIG. 3.

From the above results, it was confirmed that, even in the case in which an anodic oxidation voltage corresponding to the long interval was applied to the arrangement of pits of the rectangular shape formed on the substrate, it was possible to form the nanoholes branching into two as in the first example. However, it was also confirmed that the nanoholes having branched into two could be formed only in the case in which the pits were arranged in a rectangular shape of 100 nm×180 nm and 100 nm×200 nm on the substrate, and a range of the arrangement of pits was limited to be narrower compared with the case in which the anodic oxidation voltage corresponding to the short interval was applied as in the first example.

It was confirmed that the results of the second example showed the same tendency as the results of the first example except that the range of the arrangement of pits in which the nanoholes having branched into two could be formed was narrowed. It was also confirmed that, as the difference between the long interval and the short interval was reduced, the shape of the nanoholes became closer to columns, and the sectional shape thereof became closer to circles. Conversely, as the difference between the long interval and the short interval was increased, the sectional shape became closer to rectangles, and, although the nanoholes branched into two, nanoholes were formed from places other than the starting points for formation of the nanoholes provided on the substrate, and irregularity in arrangement of the nanoholes was caused.

Third Example

This example relates to filling a magnetic material in the nanoholes having branched into two, which is formed in the first example, with plating.

Ti was deposited with a thickness of 5 nm on an Si (100) substrate, Cu was deposited with a thickness of 50 nm on the Ti, and Al was deposited with a thickness of 200 nm on the Cu by sputtering, and pits arranged in the rectangular shape of 100 nm×180 nm were formed on the surface of the substrate by pressing a stamper against the surface of the Al as in the first example. In this case, a density of the formed pits was approximately 36 Gdot/in². An anodic oxidation voltage of 40 V was applied to the substrate at a temperature of 16° C. in 0.3 mol/L of an oxalic acid solution to subject the substrate to anodic oxidation. Thereafter, the substrate was subjected to pore widening for forty minutes in 5 wt % of a phosphoric acid.

Ni was filled in a sample manufactured by the above-mentioned procedure by plating. In the plating, a solution obtained by mixing 0.2 mol/L of nickel (II) sulfate heptahydrate and a water solution consisting of 0.3 mol/L of boric acid at a ratio of 1:1 was used as an electrolytic solution at 24° C. Ag/AgCl was used for a reference electrode, and plating of Ni was performed at an electrodeposition voltage of −1.0 V.

Figure 7A:
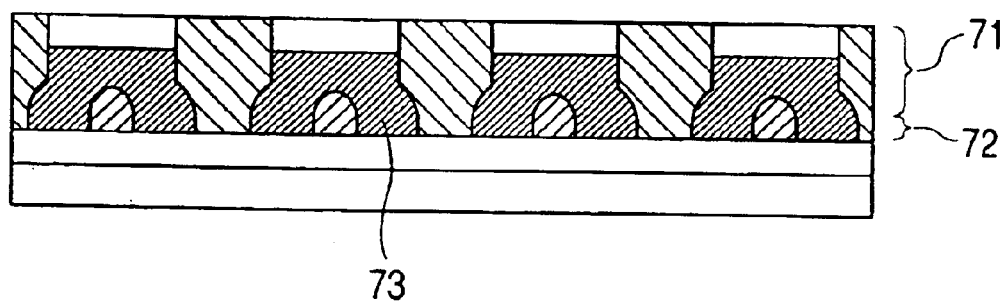
FIGS. 7A and 7B are schematic diagrams showing nanoholes filled with Ni.
Figure 7B:
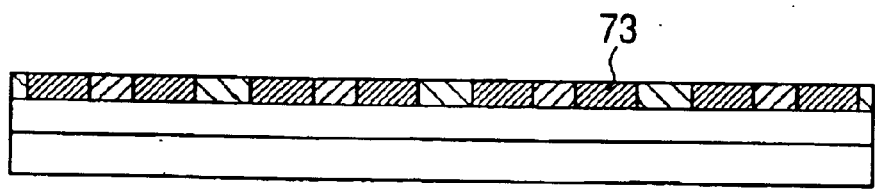

Subsequently, surface polishing was performed using diamond slurry with a diamond particle diameter of ¼ μm as an abrasive, nanoholes 71 not having branched into two were removed from the Ni-filled product in a state shown in FIG. 7A to become a state of FIG. 7B in which a flat surface is formed with Ni 73 filled in nanoholes 72 after branching into two even with the surface of the substrate.

Figure 8:
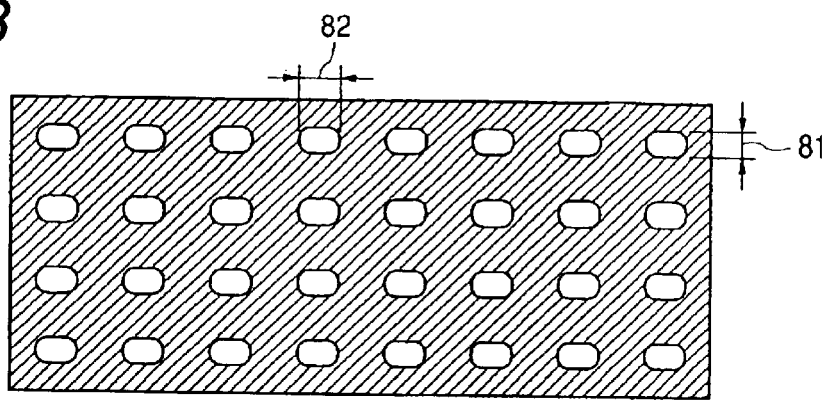
FIG. 8 is a schematic diagram showing a surface of a substrate from which nanoholes not having branched into two are removed by polishing after Ni is filled.

When a part of the surface of the substrate was observed by the FE-SEM, it was confirmed that Ni was filled in all the nanoholes. In addition, in this case, a shape of the nanoholes exposed to the surface of the substrate was rectangular with the short side 81 of about 40 nm and the long side 82 of about 70 nm and roundish four corners as shown in FIG. 8. A density of the nanoholes was approximately 72 Gdot/in².

Figure 9:
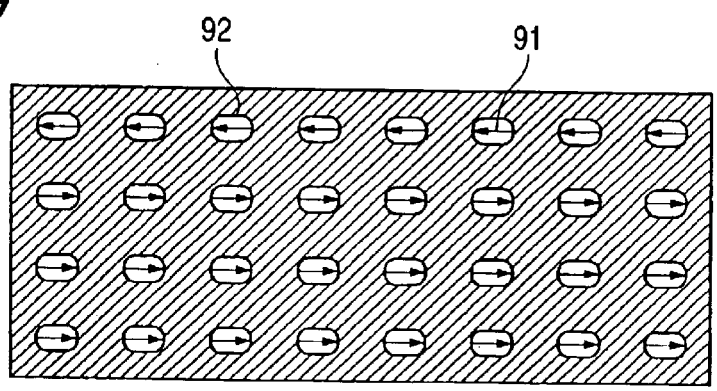
FIG. 9 is a schematic diagram of an MFM image on the surface of the substrate immediately after plating.

Moreover, observation of the surface of the substrate was performed by an MFM (magnetic force microscope) in order to observe a magnetization state of Ni. As a result, it was confirmed that the magnetization direction 91 of Ni filled in the nanoholes 92 were arranged in the long side direction in the plane of the substrate as shown in FIG. 9. In other words, it could be confirmed that, reflecting shape anisotropy according to the sectional shape of the nanoholes 102, an easy axis was in the long side direction.

Figure 10:
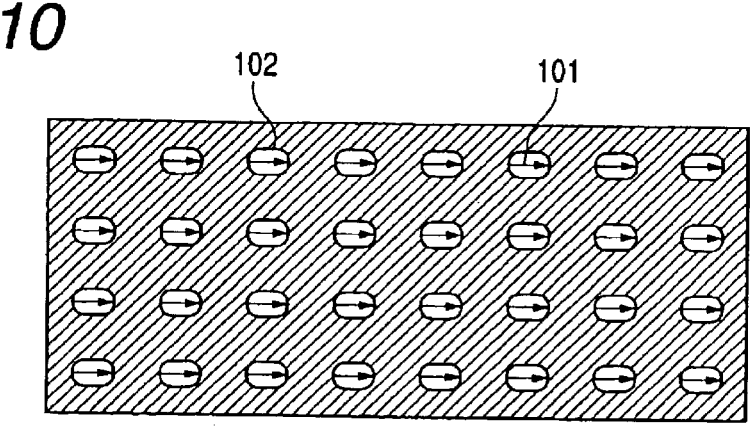
FIG. 10 is a schematic diagram of an MFM image after applying a magnetic field.
Figure 10:
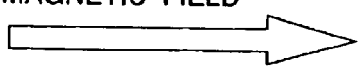

In addition, when observation by the MFM was performed in the same manner as described above after an external magnetic field of 1 kOe was applied in the long side direction of the sectional shape of the formed nanoholes, no magnetic interference was confirmed between the nanoholes adjacent to each other, and it was confirmed that all magnetization direction 101 were arranged in the direction of the applied magnetic field as in the state shown in FIG. 10.

For the purpose of comparison, pits arranged in a square shape of 100 nm×100 nm were formed in a substrate, columnar microholes without shape anisotropy according to a sectional shape was created by subjecting the substrate to anodic oxidation in the same manner, and Ni was filled in the pits and surface polishing of the substrate was performed. It was confirmed that, in an MFM image of this case, magnetizations of Ni faced in random directions and were not arranged in one direction. When observation by the MFM was performed after 1 kOe of an external magnetic field was applied, almost all magnetizations were arranged in the direction of the applied magnetic field, but there were some magnetizations facing in different directions here and there.

From the above results, it was confirmed that it became possible to create nanoholes with a density twice as high as a density at starting points for nanohole formation, which were formed on a substrate by a stamper, by causing nanoholes to branch into two in a formation process thereof to thereafter remove portions which did not branch into two.

In addition, it was confirmed that, in the case in which a magnetic material was filled, magnetization directions were arranged in one direction reflecting shape anisotropy according to the sectional shape of nanoholes, and this state could be maintained and that there was no magnetic interference between nanoholes adjacent to each other. It was also confirmed that it was possible to use the nanoholes as a magnetic recording medium.

Fourth Example

This example relates to recording performed by a magnetic head with respect to the samples created in the third example.

Figure 11:
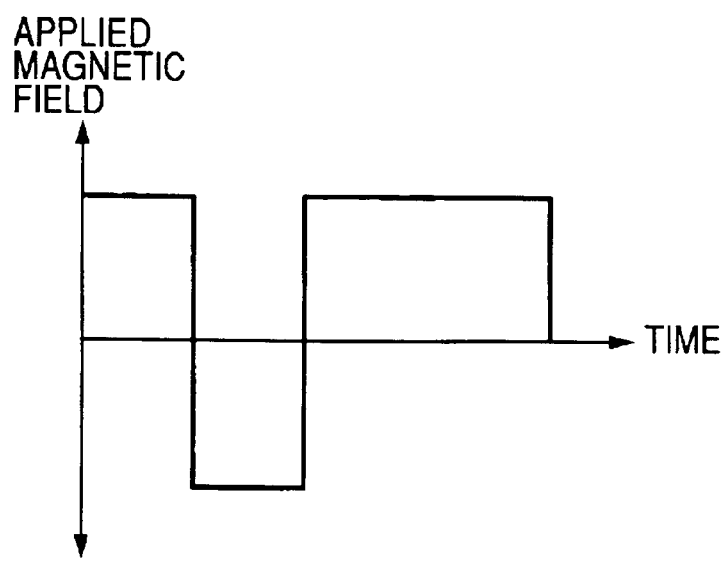
FIG. 11 is a profile of a pulse magnetic field applied in a magnetic head.
Figure 12:
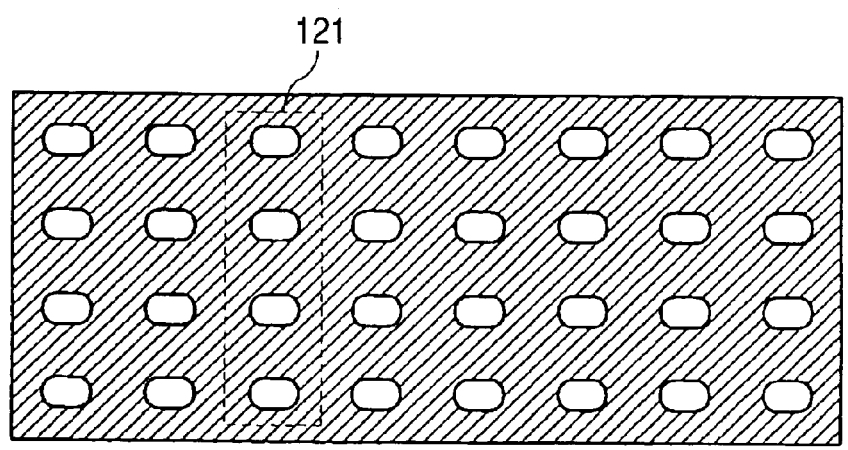
FIG. 12 is a schematic diagram showing a one-bit recording region.

Recording to the samples was performed while a pulse magnetic field shown in FIG. 11 was applied using a ring type head from the surface of the samples created in the third example. In this example, examination was performed with a rectangular region of approximately 300 nm×90 nm as shown in FIG. 12 as a recording region 121 of one bit.

After the recording was performed, surface observation by the MFM was performed. It was confirmed that there was no magnetic interference between nanoholes adjacent to each other, and magnetizations corresponding to an applied magnetic field by the magnetic head were recorded and maintained.

From the above result, it was confirmed that the nanoholes were capable of performing recording as a magnetic recording medium. However, the recording region of one bit is not limited to the recording region of this example, and any recording region may be used as long as it has a shape and a size which allow recording by the magnetic head. For example, one bit may be recorded with respect to a magnetic material filled in one nanohole as a patterned medium, or one bit may be recorded with respect to a magnetic material filled in plural nanoholes as a discrete medium as in this example.

Fifth Example

This example relates to a recording/reproducing apparatus using the magnetic recording medium of the fourth example.

As described in the fourth example, the magnetic recording medium according to the present invention is capable of arranging magnetization directions by application of a magnetic field and is also capable of maintaining magnetizations in a state in which a magnetic field is not applied.

Figure 13:
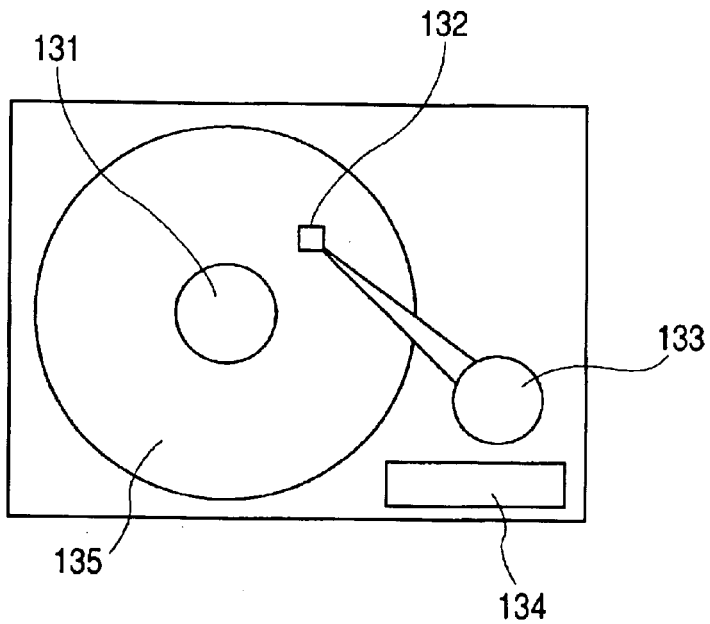
FIG. 13 is a conceptual diagram showing a recording/reproducing apparatus using the magnetic recording medium according to the present invention.

Thus, it is possible to form a magnetic recording/reproducing apparatus by incorporating the magnetic recording medium 135 according to the present invention into an apparatus consisting of a magnetic recording medium drive section 131, a recording/reproducing magnetic head 132, a magnetic head drive section 133, and a signal processing section 134 as shown in FIG. 13. However, drive of the magnetic recording medium is not limited to only rotation or drive of the magnetic head is not limited to only slide on a circumference by this example.

Sixth Example

This example relates to an information processing apparatus using the recording/reproducing apparatus of the fifth example.

Figure 14:
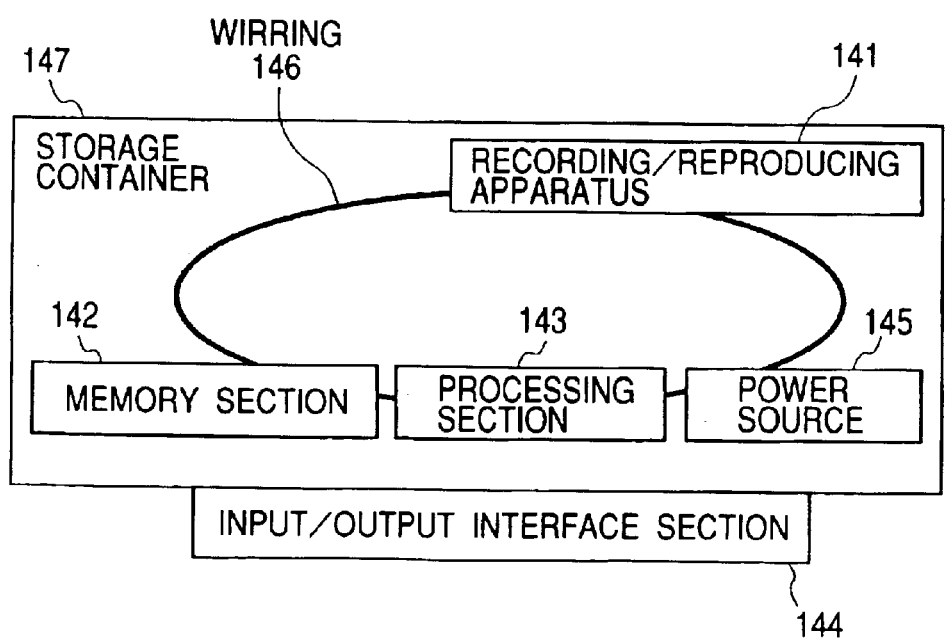
FIG. 14 is a conceptual diagram showing an information processing apparatus using the recording/reproducing apparatus according to the present invention.

Since it is possible to input and output information to and from the recording/reproducing apparatus of the fifth example, as shown in FIG. 14, it is possible to form an information processing apparatus containing a recording/reproducing apparatus 141, a memory section 142, a processing section 143, an input/output interface section 144, and a power source 145, as well as a wiring 146 connecting them in a storage container 147.

According to the present invention, in a structured material using anodically oxidized aluminum nanoholes, nanoholes of a shape close to an ellipse or rectangle are created, whereby it becomes possible to give shape anisotropy according to the sectional shape to a functional material to be filled in the nanoholes and use the nanoholes as a functional element.

In addition, according to the related invention of the present invention, in a magnetic recording medium using anodically oxidized aluminum nanoholes, nanoholes of a shape close to an ellipse or rectangle are created, whereby it becomes possible to give shape anisotropy according to the sectional shape to a magnetic material filled in the nanoholes and maintain stable magnetizations. Moreover, a magnetic recording medium, in which a relative positional relation between a magnetic head and magnetizations is always fixed, can be provided.

Further, according to the related invention of the present invention, a patterning technique such as electron beam lithography and self-organization are combined, whereby it is made possible to easily manufacture a magnetic recording medium with higher density.

What is claimed is:

1. A method for manufacturing a structured material, comprising the steps of: preparing a member having a plurality of pits that are arranged regularly; subjecting the member to anodic oxidation treatment so that formation of holes is started with the pits as starting points, and a porous region, which has a first portion where the holes are formed without branching and a second portion where branched holes are formed, is formed; and removing the first portion.

2. A method for manufacturing a structured material, comprising the steps of:

preparing a member having a plurality of pits that are arranged regularly; and subjecting the member to anodic oxidation treatment so that formation of holes is started with the pits as starting points, and a porous region, which has a first portion where the holes are formed without branching and a second portion where branched holes are formed, is formed.

3. The method for manufacturing a structured material according to claim 2, wherein said member has pits that are arranged in a rectangular shape or a rhomboidal shape.

4. The method for manufacturing a structured material according to claim 2, wherein said member has pits that are arranged in a rectangular shape or a rhomboidal shape, a long interval of the pits being 1.5 to 2.0 times as long as a short interval of the pits.

5. The method for manufacturing a structured material according to claim 2, comprising the additional step of filling a magnetic material in said holes after formation of said second portion.

6. The method for manufacturing a structured material according to claim 5, comprising the additional step of removing said first portion after the filling step.

* * * * *